(No Model.)
J. A. ROMANO & E. A. BARTON.
FLY WHEEL.
No. 392,760. Patented Nov. 13, 1888.
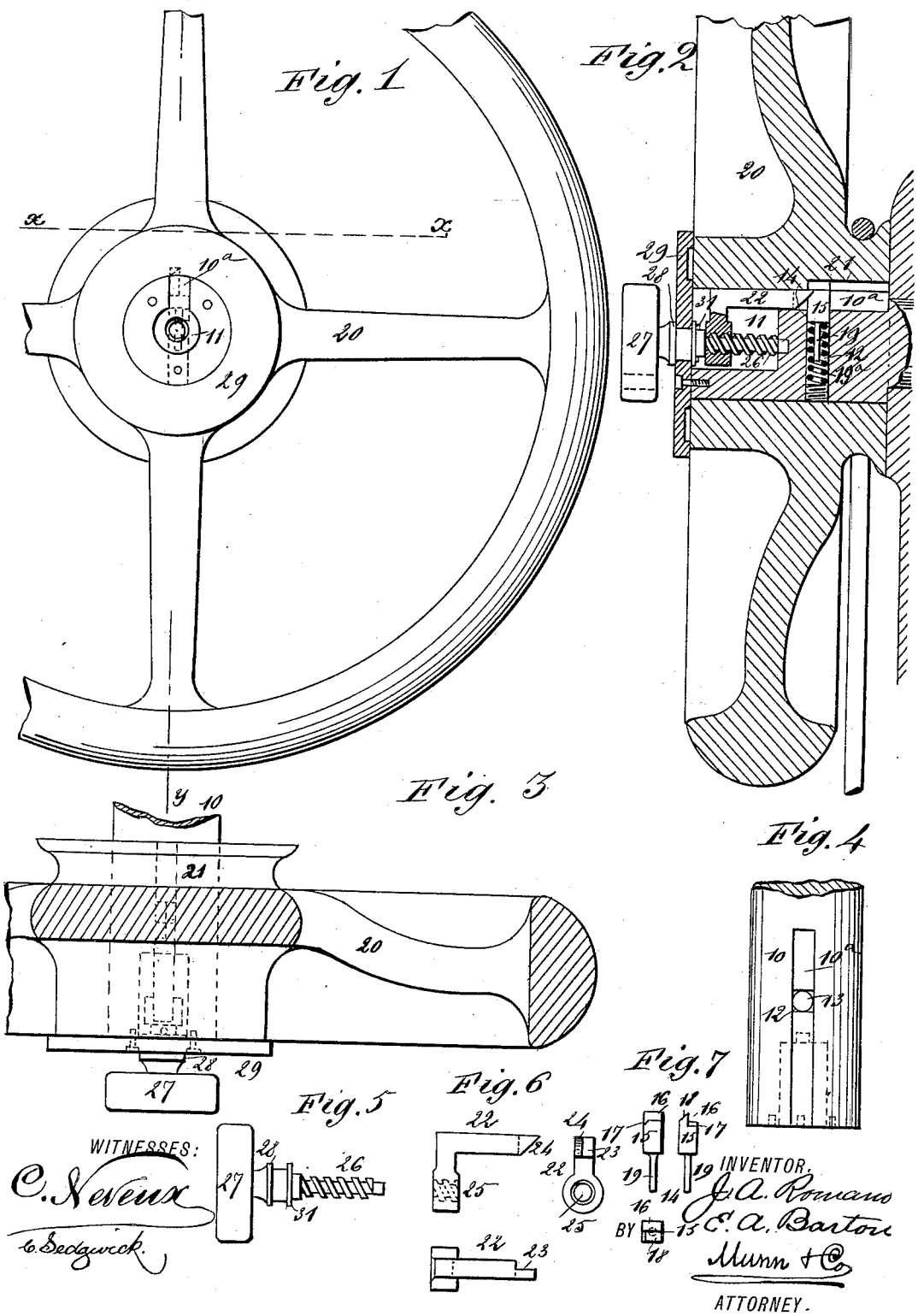
WITNESSES:
C. Neveux
C. Sedgwick
INVENTOR.
J. A. Romano
E. A. Barton
BY Munn & Co
ATTORNEY.

UNITED STATES PATENT OFFICE.

JESUS ALVA ROMANO AND ERNEST ALBERT BARTON, OF CELAYA, GUANAJUATO, MEXICO.

FLY-WHEEL.

SPECIFICATION forming part of Letters Patent No. 392,760, dated November 13, 1888.

Application filed May 1, 1888. Serial No. 272,413. (No model.)

*To all whom it may concern:*

Be it known that we, JESUS ALVA ROMANO and ERNEST ALBERT BARTON, of Celaya, State of Guanajuato, Mexico, have invented a new and Improved Fly-Wheel for Sewing-Machines, of which the following is a full, clear, and exact description.

Our invention relates to a fast and loose attachment for sewing-machines, and has for its object to provide a means whereby the fly-wheel may be revolved with the shaft in one direction and independently thereof in a contrary direction, and also whereby the said fly-wheel may be virtually disconnected from the driving-shaft of the machine, so as to turn independently of the said shaft in either direction.

The invention consists in the construction and combination of the several parts, as will be hereinafter fully described, and set forth in the claims.

Reference is to be had to the accompanying drawings, forming a part of this specification, in which similar figures of reference indicate corresponding parts in all the views.

Figure 1 is a partial side elevation of a fly-wheel attached to the drive-shaft of a sewing-machine. Fig. 2 is a vertical section on line $yy$ of Fig. 1. Fig. 3 is a transverse section on line $xx$ of Fig. 1. Fig. 4 is a partial plan view of the shaft. Fig. 5 is a side elevation of the thumb-screw. Fig. 6 illustrates, respectively, a side elevation, a plan view, and an end elevation of the locking-bolt; and Fig. 7 illustrates, respectively, a side elevation, a front elevation, and a plan view of the latch.

The drive-shaft 10 is provided with a longitudinal groove, $10^a$, a recess, 11, in the outer end intersecting said groove, and a diametrical aperture, 12, leading into said groove to the rear of the recess, which aperture is rectangular for the greater portion of its length, as best shown in Fig. 4, being circular at one end and interiorly threaded at said circular portion, as shown at 13, and stopped or plugged with a screw.

In the aperture 12 a latch, 14, is held, consisting of a head, 15, which head is provided with a recess, 16, upon one side, one end wall of said recess being beveled, as shown at 17 in Fig. 7, and the upper surface of the head is beveled also, as illustrated at 18 in the same figure. From the under surface of the head a shaft or pintle, 19, is projected, which pintle is surrounded by a spiral or coil spring, $19^a$, bearing, respectively, upon the screw-plug and under face of the latch-head, as best shown in Fig. 2.

The hub of the fly-wheel 20, at the inner end, is provided with a short interior longitudinal groove, 21, adapted to normally receive the head of the spring-actuated latch.

Within the groove $10^a$ and also the recess 11 a locking-bolt, 22, is held to slide, which locking-bolt is preferably angular, the horizontal member sliding in the said groove $10^a$ and the vertical member in the recess 11. The extremity of the horizontal member of the locking-bolt is provided with a vertical recess, 23, upon one side and a beveled under surface, 24, as best shown in Fig. 6. The extremity of the vertical member of the locking-bolt is enlarged, and in said enlargement a threaded aperture, 25, is produced adapted to receive the threaded member 26 of a set-screw, 27.

The operating-screw 27 is provided with the usual serrated head, and upon the threaded steam adjacent to the head a shoulder, 28, is formed. A cap-plate, 29, is made to engage the shoulder, which plate is secured to the shaft in any approved manner, revolving with said shaft and around the operating-screw. The inner end of the threaded member of the operating-screw is smooth and supported in an aperture in the rear wall of the recess 11, as shown in Fig. 2, and the operating-screw is held in position by means of a washer, 31, held in connection with the screw and inner surface of the cap or face plate 29.

It will be observed that by turning the operating-screw the locking-bolt may be either brought forward or carried rearward, as desired.

In operation, if the fly-wheel is revolved in a direction to bring the wall of the groove 21 in contact with the straight wall of the latch-recess 16, the said wheel will carry the shaft with it. If, however, the wheel is turned in an opposite direction, the wall of the said hub-groove 21 coming in contact with the upper beveled surface, 18, of the latch will depress the latter and turn independently of the shaft, and then the attachment for winding thread on a bobbin or spool may be applied without having to take off the sewing or the band or to look after threads, &c.

When it is desirable to have the wheel revolve independently of the shaft in either direction, the locking-bolt is slid in the direction of the arm of the machine by means of the operating-screw, whereupon the beveled surface 24 of the locking-bolt coming in contact with the beveled surface 17 of the latch-head, as shown in Fig. 2, rides over and depresses the latter. The latch being thus held within the aperture 12 is not engaged by the hub of the fly-wheel, and said wheel may consequently be revolved independently of the shaft.

Having thus described our invention, what we claim as new, and desire to secure by Letters Patent, is—

1. The combination, with the drive-shaft of a sewing-machine provided with a recess in its outer end, a longitudinal groove intersecting said recess, and a diametrical aperture also intersecting the said groove and closed at one end, and a spring-actuated latch held in said aperture, having a recessed and beveled head, of a fly-wheel held to revolve upon said shaft, provided with a longitudinal groove to receive said latch-head, an angular locking-bolt sliding in said shaft, recess, and groove, having one member recessed and beveled to engage the head of the latch, and an operating-screw adapted to communicate movement to the locking-bolt, substantially as and for the purpose specified.

2. The combination, with the drive-shaft of a sewing-machine provided with a recess in its outer end, a longitudinal groove intersecting said recess, and a diametrical aperture also intersecting the said groove and closed at one end, and a spring-actuated latch held in said aperture having a recessed and beveled head, of a fly-wheel held to revolve upon said shaft, provided with a longitudinal groove to receive the latch-head, an operating-screw extending horizontally within the shaft-recess, a cap-plate turning upon said set-screw and secured to the shaft, and an angular locking-bolt having one member adapted to travel upon the operating-screw and the other member provided with a recessed and beveled surface adapted to engage the latch, as and for the purpose specified.

JESUS ALVA ROMANO.
ERNEST ALBERT BARTON.

Witnesses:
FÉLIX LEOFEROY GONZALES,
YGNO ALATORRE.